June 8, 1926.

J. H. STEIN

BIRD HOUSE

Filed June 12, 1924    2 Sheets-Sheet 1

1,587,804

INVENTOR.
John H. Stein

BY

ATTORNEY.

June 8, 1926.
J. H. STEIN
1,587,804
BIRD HOUSE
Filed June 12, 1924  2 Sheets-Sheet 2
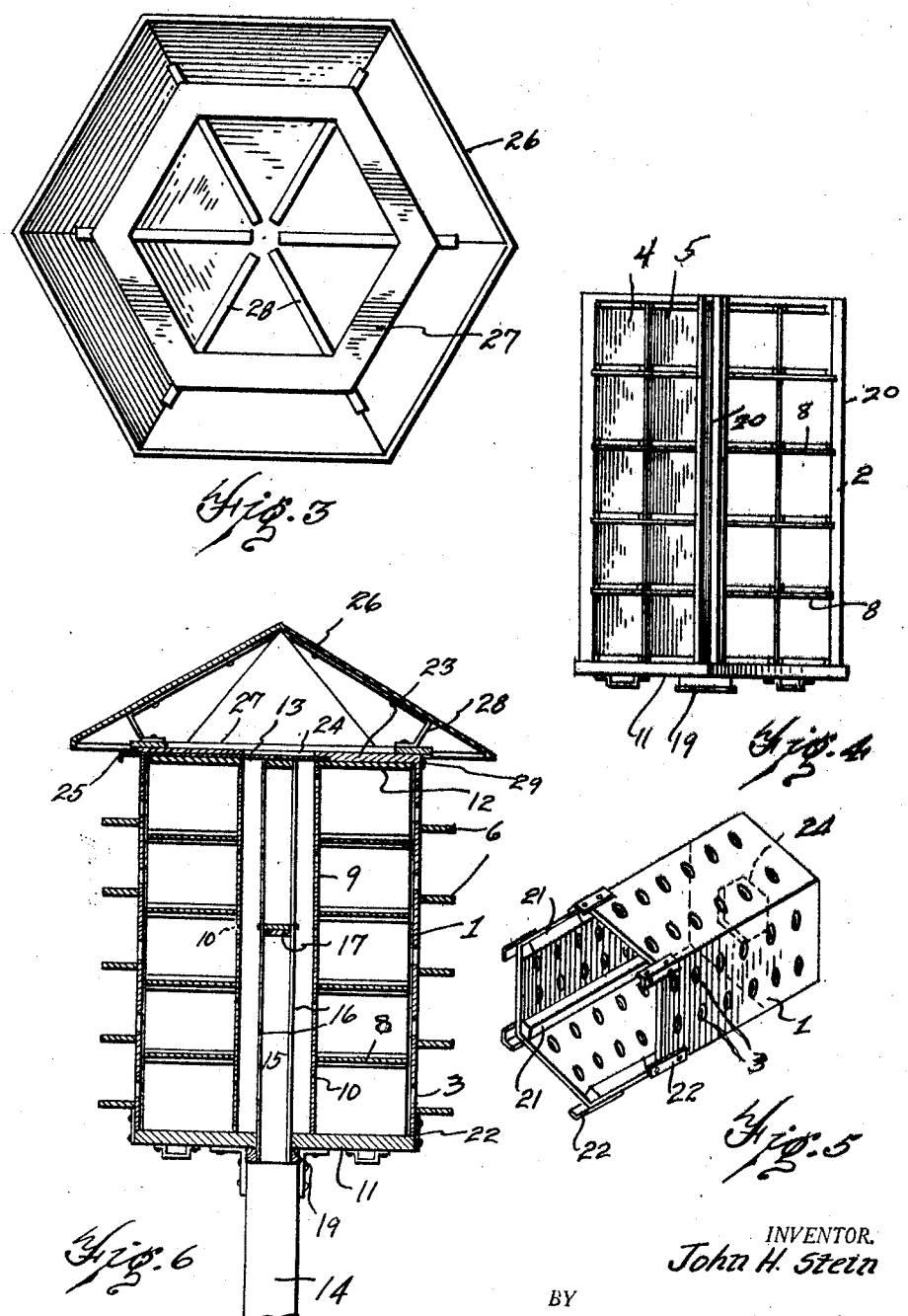
INVENTOR.
John H. Stein
BY
ATTORNEY.

Patented June 8, 1926.

1,587,804

UNITED STATES PATENT OFFICE.

JOHN H. STEIN, OF DETROIT, MICHIGAN.

BIRD HOUSE.

Application filed June 12, 1924. Serial No. 719,495.

This invention relates to bird houses, and the object is to provide a bird house of simple construction that is easily disassembled for cleaning purposes, and that has a number of nest sections such as is desirable in martin houses for instance and may be made in various lengths providing for bird colonies of greater or less numbers.

A feature of the invention is in the construction of the bird house which consists of two elements, the inner of which contains the nest boxes having open fronts and an exterior wall telescoping thereover having openings registering with each of the nest sections for the ingress and egress of birds.

A further feature is in the provision of means for ventilating the entire series of nest boxes particularly a construction permitting ventilation through a central hollow column, the walls of which provide the backs or rear walls of the nest boxes.

Further features are involved in the manner of supporting the bird house on a post and in the provision of a runway at each story of the house just below the openings to the nest boxes on the external member, and an additional feature is in the construction of the bird house in the form of a hexagon in cross section. This is a desirable feature in a bird house for colonies of birds, numbers of which are alighting at the same time interval and, by forming the structure in a hexagonal shape, the nest boxes are more readily accessible as the wings of the birds lighting on one section will not strike those of the birds alighting on an adjoining section. These and other objects and the several novel features of the invention are hereinafter more fully described and claimed, and the preferred form of construction of a bird house embodying my invention is shown in the accompanying drawings in which—

Fig. 3 is an interior plan view of the roof.

Fig. 4 is an elevation of the interior member providing the nest sections or boxes.

Fig. 5 is a perspective view on a reduced scale of the exterior wall member fitting over the member shown in Fig. 4.

Fig. 6 is a vertical section of the assembled bird house.

Figures 1, 2:
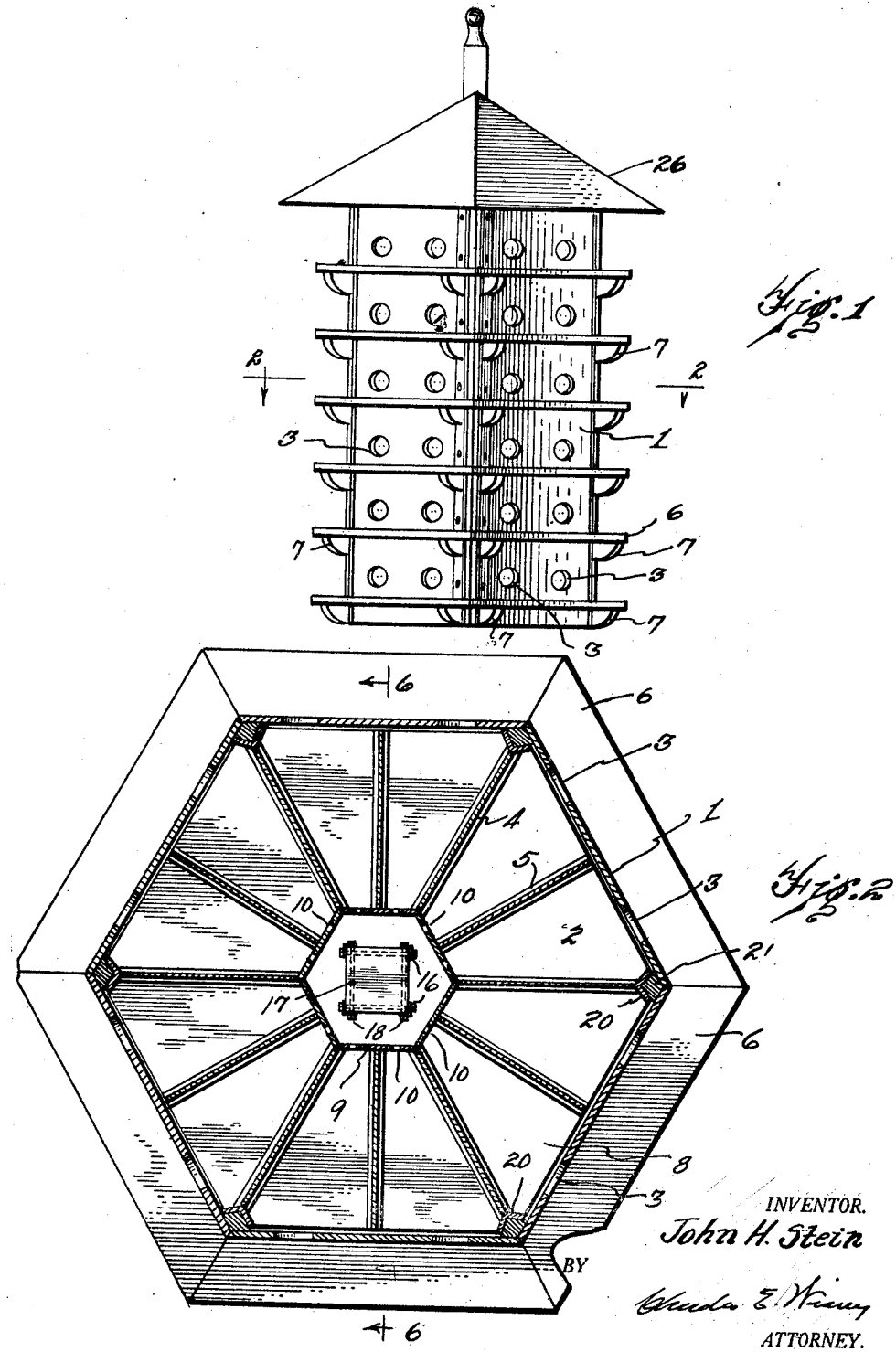
Fig. 1 is an elevation of a bird house embodying my invention.
Fig. 2 is a cross section on an enlarged scale taken on line 2—2 of Fig. 1.

The bird house is preferably hexagonal in shape and consists of an external shell 1 of hexagonal form and an internal member 2 over which the shell fits. The external member 1 on each side of the hexagonal wall is preferably provided with two openings 3—3 for ingress and egress of the birds to the adjoining nest boxes formed between the walls 4 and 5 in each instance of the interior member 2 and to which the respective openings 3—3, etc., lead.

On the external wall for each story of the bird house is provided a runway 6 for a landing stage as is illustrated clearly in Figs. 1, 2 and 6, and these members are supported on the hexagonal wall by means of brackets 7 preferably secured to the external wall by means of screws to enable the landing platform to be removed for cleaning and painting. The interior member, as will be understood from Figs. 2, 4 and 6, is formed of a series of floor members 8 for each story and partitions or walls 4 and 5 extend between adjacent floor members and form the nest boxes or nest sections as shown in Fig. 2. These partitions 4 and 5 are in radial relation and the floor members have a central hexagonal aperture in which is the hollow column 9 formed of hexagonal walls and provided with apertures 10 leading into each nest section. This hexagonal member 9 extends from the bottom member 11 of the interior member to the top 12 thereof as indicated in Fig. 6 and the top member 12 is provided with an opening 13 but the interior of the member 9 is closed to atmosphere by the base member 11. As will be understood this bird house is to be mounted on the top of a pole 14 which may conveniently be a member, the major portion of which is six inches square and at the upper end for a distance is cut to four inches square, the upper end being indicated at 15.

As will be understood from Fig. 2, there are four vertical angle iron members 16 which extend from the bottom member 11 to the top member 12 being fastened at the opposite ends to the respective members, and these angle irons are arranged in a square to receive the upper end 15 of the pole. The portion 15, however, need not be the full length of the bird house and therefore I have provided plates 17 preferably of wood extending between the angle iron members about midway of their length as will be understood from Fig. 6 which rest upon the top of the pole. These blocks or plates 17 may be secured in the angle iron members by means of bolts 18 as will be understood from Fig. 2. Preferably, I provide a molding 19 around the opening in the bottom member 11 for appearance sake although such arrangement is unnecessary.

The internal member is also provided with the vertical channels 20 at each corner. These channels may be of wood or metal as may be desired, and the external member 1 at each re-entrant angle is provided with a strip 21 fitting these channels 20 and in which the members 21 may slide in assembling the shell and the nest box member. This arrangement will be readily understood from Fig. 2.

From the foregoing description it will be readily understood that, at the end of the season, the pole may be taken down in any convenient way and the bird house removed entirely from the end thereof by withdrawal from the portion 15 of the pole. This external shell 1 may be withdrawn from the interior nest section 2 which will expose the open ends of the nest boxes permitting the nesting material to be removed and the boxes cleaned. Also the structure may be readily painted as the parts are in such disassembled relation that every portion of the device is open to inspection and for cleaning and painting. In fact the landing stages 6 may be removed and painted a different color and the bird house is readily painted in different colors to secure the desired appearance.

In assembling the shell 1 on the interior nest section 2, I provide at the lower end of the shell small angle members 22 which are secured to the shell at one end by screws and when assembled are secured by means of screws to the corners of the bottom member 11 of the inner member. This will be readily understood from Fig. 6. This shell 1 has a top member 23 in which is an opening 24 shown by dotted lines in Fig. 5. This member 23 rests directly upon the top member 12 of the interior nest section as will be understood from Fig. 6 and the opening 24 therein registers with the opening 13 in the member 12. Preferably I provide a slide 25 on the under side of the member 23 which when the parts are assembled as shown in Fig. 6 may be moved to position to close the opening in the interior opening 13 and 24 preventing an egress of air through the channel formed by the member 9 or the same may be moved to partly or fully open position thus controlling the ventilation of the nest boxes which are open to this interior channel formed by the member through the openings 10.

A roof member 26, preferably pyramidal in form, is provided on the top of the device and is secured thereto by means of a ring 27 secured to the roof portion and spaced therefrom by means of a series of brackets 28. This roof extends outwardly beyond the landing stages as shown and, by spacing the roof from the upper end of the structure, as indicated in Fig. 6, air may flow up through the member 9 and out through the space between the roof and top of the assembled sections, as will be readily understood. This ring member 27 is hexagonal in form and extends slightly behind the face of the member 1 on which it is mounted, and brackets 29 are provided as indicated in Fig. 6 by means of which the ring 27 is secured to the shell 1.

By the arrangement described a bird house of any desired number of stories may be constructed in which all of the nest boxes are uniform in size and a structure is provided that is readily disassembled by removing the outer wall as a unit from the inner nest section with which it telescopes, and the structure is therefore readily cleaned and a construction is provided that is simple and comparatively inexpensive and the cost is reduced inasmuch as the different sizes of bird houses are all made of uniform sizes of material—that is, the floor members 8, the wall members 4 and 5 forming the partitions of the nest boxes and all the elements of the roof member are uniform for all sizes of houses and for houses of different numbers of stories the materials forming the outer shell and the interior member 9 would be made in specific length for the houses of three, four or other number of stories. Thus, the cost of production of a house made as outlined herein is less than with other types of structures for the purpose requiring different sizes of materials for the different sizes of houses, and a bird house obtained that is neat in appearance, and that can be made up for any number of nest boxes desired.

It is to be understood that various changes in details and form of various parts may be made without departing from the spirit of the invention as is set forth in the appended claims.

Having thus fully described my invention, its utility and mode of operation, what I claim and desire to secure by Letters Patent of the United States is—

1. A bird house comprising an exterior shell and an interior member over which the shell may be placed, means for attaching the two parts in assembled relation, the interior member being provided with a series of nest boxes and the exterior member having apertures providing for ingress and egress of birds to the individual boxes, and a tubular member extending longitudinally of the said interior member providing a back wall for the nest boxes, there being an opening in the tubular member for each nest box providing for ventilation thereof.

2. A bird house comprising a member having a series of nest boxes arranged about a center with the outer ends thereof open, a shell adapted to be placed thereover providing a closure for the said open ends of the nest boxes, the said shell having an opening for each nest box of a size providing for ingress and egress of birds.

3. A bird house comprising a member having a series of nest boxes arranged about a center and in tiers, the outer ends of the boxes being open and a shell in telescopic relation therewith providing a closure for the said open ends, there being an aperture in the shell for each nest box providing for ingress and egress of birds.

4. A bird house comprising a member of hexagonal form in plan and provided with a series of nest boxes with open outer ends arranged radially about a center, the said boxes being further arranged in tiers, a shell in telescopic relation with the said member providing a closure for the open ends of the boxes, the said shell having an opening for each nest box providing for an ingress and egress of birds, and a platform on the exterior shell for each tier of boxes and beneath the openings is the shell for the nest boxes of the respective tiers.

5. A bird house comprising a member having a series of nest boxes arranged in tiers, each tier having the boxes arranged about a center, a shell in telescopic relation therewith having apertures each opening to a nest box, a central tubular member forming the back wall of the several nest boxes, there being an aperture in the wall of the tube for each nest box, the said tubular member being open at the top providing for ventilation, and a roof member attached to the upper end of the shell and spaced therefrom providing for an egress of air, and means for varying the size of the opening at the top to regulate ventilation.

6. A bird house comprising an interior member having a series of nest boxes arranged with open outer ends, an exterior member adapted to be detachably secured thereover and providing a closure for the open ends of the boxes, the said exterior member having an aperture for each box providing for an ingress and egress of birds, rear walls on the series of nest boxes providing a chamber centrally of the interior member and open at the top, there being an aperture in the said rear wall of each nest box providing for movement of air through the nest box to the said central chamber.

7. A bird house comprising a series of nest boxes arranged about a center and in tiers providing separate stories, the floor of each story being hexagonal in form, a member connecting the several floors at the corner providing a rib member longitudinally of the tiers of the boxes, an external shell of hexagonal form in cross section having a part at each corner slidingly fitting the rib members, means for detachably securing the said first mentioned member and the shell together, a roof structure detachably secured to the assembled member and shell, and a landing stage on the exterior member for each story of the interior member.

8. A bird house consisting of an interior member having a series of floors of hexagonal form with nest boxes open to the outside on each floor, the floor members having a central aperture, a hollow member extending from the top to the bottom of the interior member, angle iron members extending through the hollow member from the top to the bottom and secured at opposite ends thereto respectively, an exterior member slidably fitting over the interior member providing an outer wall therefor and having apertures registering respectively with the open ends of the nest boxes, a roof structure secured to one end of the assembled members in spaced relation thereabove, a pole having an end fitting the angle iron members, and brackets for securing the structure to the pole, each nest box having an opening to the tubular member providing for ventilation of the same substantially as described.

9. A bird house consisting of an interior member having a series of floors, nest boxes on each floor, an outer wall having openings for the respective nest boxes, the said bird house having a central tubular member, angle iron members extending from top to bottom of the bird house within the tubular member providing a guideway and socket for a pole end, and a pole slidably fitting in the guideway provided by the angle iron members.

In testimony whereof, I sign this specification.

JOHN H. STEIN.